No. 765,078. PATENTED JULY 12, 1904.
P. JIGOUZO.
ASYNCHRONOUS MOTOR.
APPLICATION FILED DEC. 1, 1902.
NO MODEL. 2 SHEETS—SHEET 1.

WITNESSES.
Albert Jones
Herbert C. Bolwell

INVENTOR.
Paul Jigouzo
By his Attorneys.
Wheatley & Mackenzie

No. 765,078.                                                     Patented July 12, 1904.

UNITED STATES PATENT OFFICE.

PAUL JIGOUZO, OF VANVES, FRANCE.

ASYNCHRONOUS MOTOR.

SPECIFICATION forming part of Letters Patent No. 765,078, dated July 12, 1904.

Application filed December 1, 1902. Serial No. 133,427. (No model.)

*To all whom it may concern:*

Be it known that I, PAUL JIGOUZO, a citizen of the French Republic, residing at 5 Rue Jullien, Vanves, France, have invented certain new and useful Improvements in Asynchronous Motors; and I do hereby declare the following to be a full, clear, and exact description of the invention, such as will enable others skilled in the art to which it appertains to make and use the same.

This invention relates to an asynchronous motor, perferably with a squirrel-cage, (or short-circuited armature,) which has the following advantages: first, increased efficiency; second, starting under load without the employment of a strong current; third, vigorous ventilation.

The new device is also intended for use in connection with fans and centrifugal pumps.

For the purpose of enabling the invention to be understood I make use of the accompanying drawings, in which—

Figure 1:
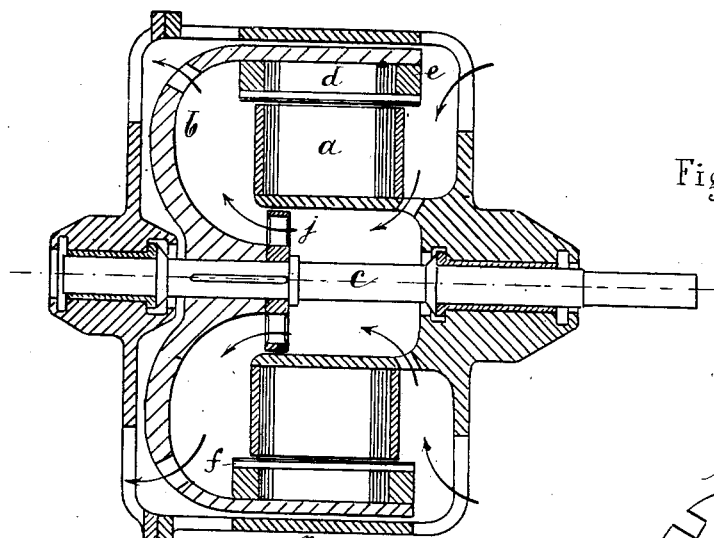
Figure 2:
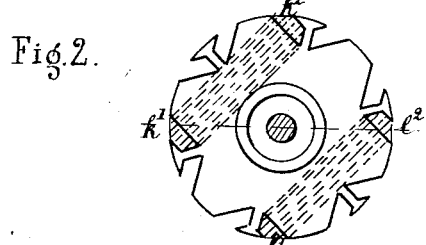
Figure 3:
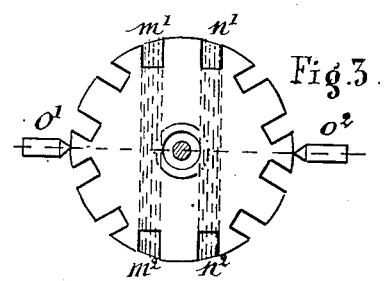
Figure 4:
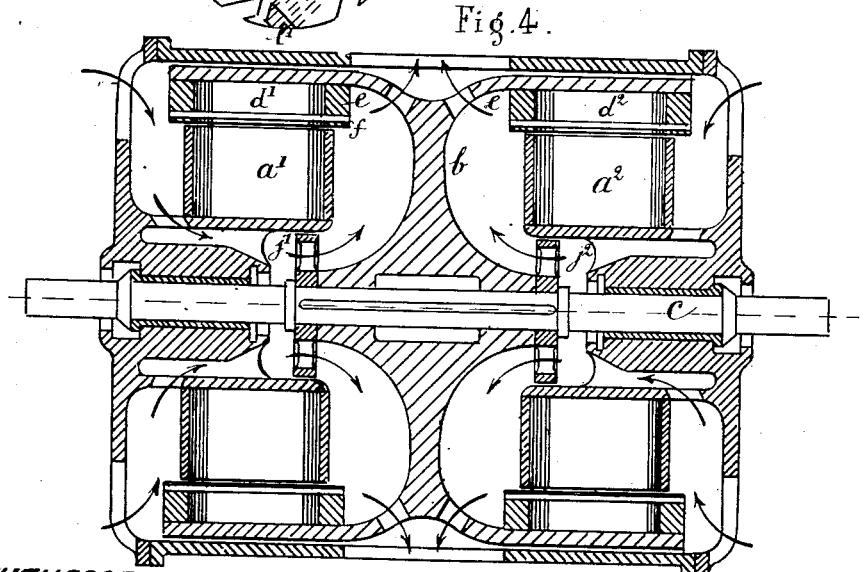
Figure 5:
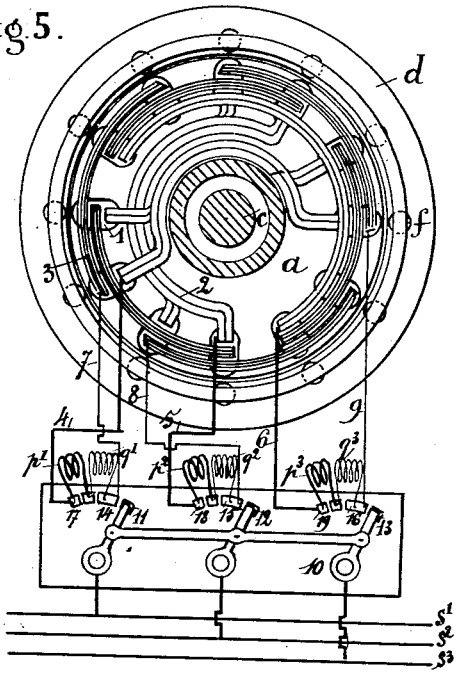
Figure 6:
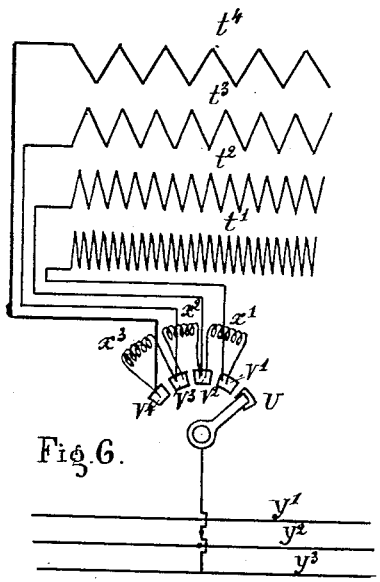
Figure 7:
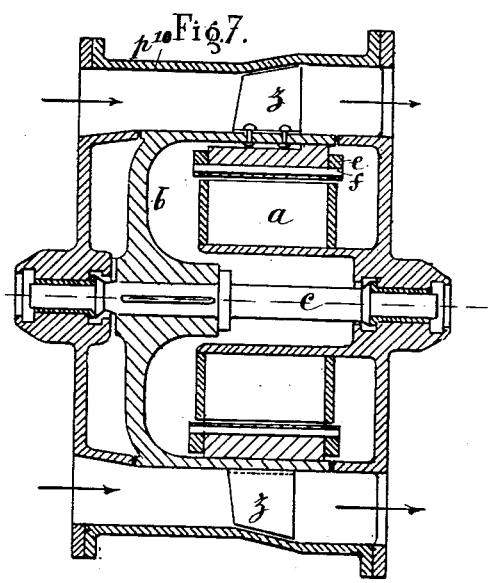

Figure 1 is a section of the motor; Figs. 2 and 3, detail views. Fig. 4 is a section of a double motor in which several starting-coils can be employed; Fig. 5, a two-step starting device; Fig. 6, a four-step starting device of a motor with four coils. Fig. 7 shows the application of the invention to a fan.

*First. Increase of efficiency.*—The losses through hysteresis and Foucault (eddy) currents in the armature of an asynchronous motor are always very considerable. The most effectual means for diminishing them, other conditions being equal, is to reduce the volume of iron in the inductor, which is easily effected by placing it in the interior of the armature. As the inductor is now fixed in order to avoid any frictional contact the armature, which is fixed to a bell keyed to the shaft, (or to a mechanical device fulfilling the same purpose,) will rotate around it. The length of the wound copper conductors being less, since the raised coils or involutions are directed toward the center instead of toward the periphery, there will be a diminution in the resistances of the circuits, and consequently a reduction of the losses. Moreover, for the inductor large diameters may be employed. The number of notches can thus be increased, which will enable the leakage to be reduced or the number of fields to be increased, and consequently a slow rate of speed rendered possible, with but slight leakage. This arrangement is illustrated in Fig. 1, in which $a$ is the fixed inductor, made of a number of thin plates. $b$ is a bell keyed to the shaft $c$. $d$ is an armature which is fixed to the bell and may consist of a number of thin plates or be in one solid piece. $e$ represents the rings for binding the sheet-metal plates employed in the construction of the squirrel-cage armature. $f$ are the bars of the squirrel-cage armature. $j$ is a fan increasing the natural ventilation and producing air-currents in the direction of the arrows.

The new arrangement enables, by the formation of notches which are not radial, but arranged parallel two by two, flat coils previously formed to be employed for the winding, an important point in connection with high-tension motors. This arrangement is illustrated on a reduced scale in Fig. 2, in which $k'$ $k^2$ are two parallel notches for the reception of a coil made separately. $l'$ $l^2$ are two parallel notches which receive a coil of the same circuit. This form of the device relates to the armature of a three-phase motor. In special cases of motors with a single field it is possible if the notches be formed one in line with the other to effect the winding easily by mounting the inductor between the two centers of a lathe. This case is illustrated on a reduced scale in Fig. 3, in which $m'$ $m^2$ are two notches formed one in line with the other, which receive a coil produced by mounting the inductor on a lathe. $n'$ $n^2$ are two notches, which receive a coil of the same circuit. This example relates to the inductor of a triphase motor. $o'$ $o^2$ are the centers of the lathe. The employment of these flat coils with rectilinear sides reduces the length of wire used, and consequently the losses from ohmic resistance.

*Second. Starting.*—In cases where the motor is to be without any rubbing contact the armature is in the squirrel-cage form. The starting under load of this high-efficiency motor without the employment of any powerful current is effected in the following manner, Fig. 5: The notches in the inductor may receive two coils, the one, 2, of conductors of normal section for the normal working with $p$ fields, the other, 3, with thinner wires for the starting with $np$ fields. This latter has far more windings than the former, so as greatly to reduce the magnetizing-current. Notwithstanding this reduction of magnetizing-current the couple at starting may have a sufficient value with regard to the increase in the number of fields and the considerable slip which is the function of this large number of windings. In these conditions by connecting the circuit 3 with the multiphase leads the starting may be effected slowly with reduced current. In order to get speed, a change is made from the circuit 3 to the circuit 2, either suddenly or gradually, the resistances withdrawn from 2, or the self-inductor coils being introduced into 3.

In Fig. 5, 1 represents the notches in the fixed inductor $a$. 4 5 6 are the cables conducting current to the normal working coil. 7 8 9 are the cables conducting current to the starting-coil. 10 is the starting-switch. 11 12 13 are the idle contact-pieces. 14 15 16 are the starting-contact pieces. 17 18 19 are the working contacts. $q'\ q^2\ q^3$ are large resistances, preventing the breaking of the circuits when a change is made from one winding to the other. $p'\ p^2\ p^3$ are supplementary resistances, limiting the current when the normal circuit is supplied. $s'\ s^2\ s^3$ are the multiphase leads.

By mounting the bearings in the interior of the inductor the total dimensions may be considerably reduced, a considerable advantage for constructions employed in traction. Finally, advantage may be taken of these supplementary windings for running at different rates of speed even continuously.

Fig. 6 illustrates the four-step starting device of a motor with four coils in which only one phase has been shown. In this figure $t^4$ is the normal winding, $t^3$ is the third starting-coil, $t^2$ is the second starting-coil, $t'$ the first starting-coil, $u$ is the idle contact of the commutator, $v'\ v^2\ v^3\ v^4$ are the contacts supplying, respectively, the circuits $t'\ t^2\ t^3\ t^4$, $x'\ x^2\ x^3\ x^4$ are resistances preventing the breaking of the circuits when a change is made from one coil to the other, and $y'\ y^2\ y^3$ are lines of the multiphase circuit assumed to be triphase.

*Ventilation.*—In asynchronous motors as constructed hitherto the ventilation is, so to say, *nil* and is difficult to effect. With the present device the bell being made with openings there arises, seeing the differences of speed between the circumferential parts and those in the center, a depression, the effect of which is to cause a circulation of air, which insures the ventilation of the windings. This ventilation can be increased by the addition of a small fan, such as $j$, Figs. 1 and 4.

Fig. 7 shows the application of the above-described motor to a fan. All that is really required is to rivet some vanes $z$ onto the bell $b$ in order to produce the effective fan device illustrated in this figure, these vanes moving at a very slight distance from the casing $p^{10}$, forming a frame. A similar device may be applied to centrifugal pumps. All that is necessary is to fix some vanes on the rotary bell.

What I claim, and desire to secure by Letters Patent, is—

1. In a motor of the character described, the combination with a rotatable shaft, and a frame provided with openings, of a bell fixedly secured to the shaft and provided with openings, an armature carried by the bell, and an inductor arranged within the interior of the armature.

2. In a motor of the character described, the combination with a rotatable shaft, and a frame provided with openings, of a bell fixedly secured to the shaft and provided with openings, an armature carried by the bell, and an inductor arranged within the interior of the armature, and a fan arranged to produce a current of air through the various openings.

3. The combination with a rotatable shaft, of a bell secured thereto, an armature carried by the bell, an inductor arranged within the bell and provided with notches arranged in pairs, the notches of each pair being parallel with each other and windings engaging in the notches, substantially as described for the purpose specified.

In testimony whereof I have affixed my signature in presence of two witnesses.

PAUL JIGOUZO.

Witnesses:
CHARLES FABER,
EDOUARD HEYSAERT.